(No Model.)
J. C. WHITFORD.
DRIVING GEARING.
No. 400,981.  Patented Apr. 9, 1889.
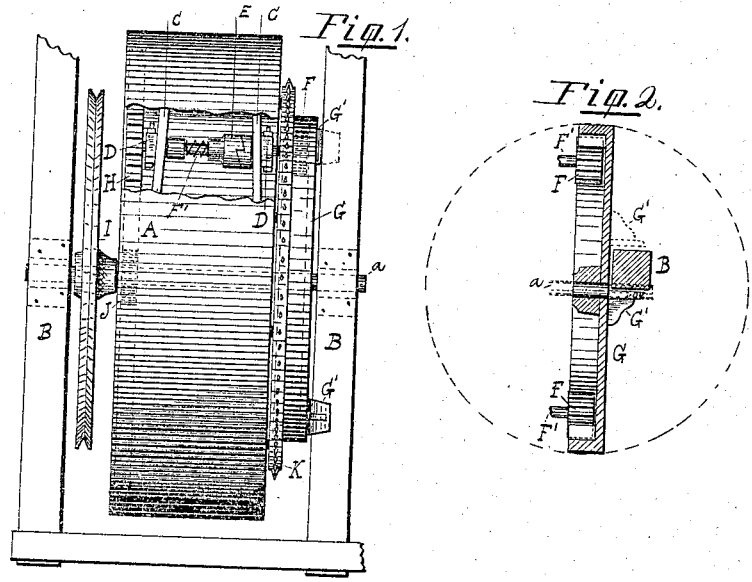
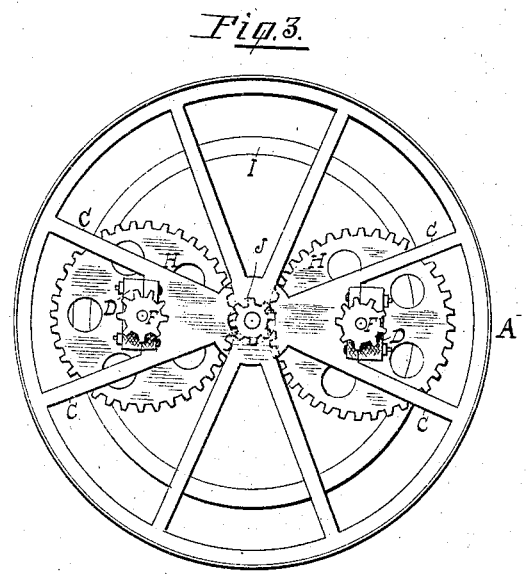
Witnesses,
Elihu B. Stowe.
T. Lewis Dennis.
Inventor,
John C. Whitford,
By Joshua B. Webster, Atty.

UNITED STATES PATENT OFFICE.

JOHN C. WHITFORD, OF STOCKTON, CALIFORNIA.

DRIVING-GEARING.

SPECIFICATION forming part of Letters Patent No. 400,981, dated April 9, 1889.

Application filed July 25, 1888. Serial No. 281,028. (No model.)

*To all whom it may concern:*

Be it known that I, JOHN C. WHITFORD, a citizen of the United States, residing at Stockton, in the county of San Joaquin and State of California, have invented certain new and useful Improvements in Driving-Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in the gearing employed to drive the actuating mechanism of traveling thrashing-machines and traction-engines.

In the accompanying drawings, Figure 1 is a general plan view of a driving-wheel and its supporting-frame, a portion of the wheel being broken out to show one set of gearing and spring-clutch. Fig. 2 is a vertical section of the internal gear and its connecting-pinions. Fig. 3 is a side view of the wheel with the sprocket-wheel and internal gear removed.

The letter A indicates the main drive-wheel, which is mounted on the axle and keyed thereto, as will be presently explained. The beams B B of the supporting-frame of the main driving-wheel A may be of any desired construction. The journal-bearings of the axle $a$ of the wheel A are in boxes secured to the beams B B. This main drive-wheel A may receive an endless band from any suitable motive power, and is designed to impart motion to wheels or pulleys, as will be presently explained.

G indicates a large internal gear-wheel located upon the axle $a$ beside the large drive-wheel A. To the face of this wheel G are attached lugs G' G', which impinge one above and the other below the beam B, so as to prevent the wheel G from turning on the axle with the wheel A, but allows of a slight play, so as to counteract the influence of the springing of the beam when subject to unusual strain. Intermeshing with the gear G are two spur-pinions, F, upon transverse shafts F', which have their journal-bearings in boxes D, attached to any suitable supports between the spokes of the wheel A. Upon the opposite ends of the shafts F' are secured spur-gears H H, which intermesh with a spur-pinion, J, upon the hub of a V-faced pulley, I, upon the end of the axle $a$, upon which pulley a belt may be used to actuate certain portions of the machine, as in the case of use upon a traveling thrasher it would be used to actuate the cylinder, fan, and shoe. A large sprocket-wheel, K, is secured to the spokes of the wheel A, so as to move therewith, and may be used upon a traveling thrasher to run the grain-carrier, &c., by a connecting chain belt. On the shafts F', which have their bearings in boxes on the spokes of the main wheel A, are spring-clutches E. These clutches are of the ordinary construction, and, being backed by a spring, will prevent any backward movement of the sprocket-wheel K.

Heretofore in machines of the class I have mentioned the driving-gearing has been located at different points of the frame. As a consequence the beams of the frame have been of a great size, in order to give the requisite rigidity to endure the strain. By locating the gearing, as I have shown, entirely within and about the main wheel and its shaft, I furnish a machine of smaller dimensions and less weight, and also the concentration of the gearing compactly within a small space reduces the waste power to a minimum and prevents much friction.

Having thus described my invention, what I claim as new is—

1. The herein-described improvement in machine driving-gearing, comprising the beams B, the wheel A and its axle $a$, the internal gear-wheel, G, having the lugs G' G', the spur-pinions F F, the shafts F' F' and their boxes D, the spur gear-wheels H H, and the V-faced pulley I, with the spur-pinions J upon its hub intermeshing with the spur gear-wheels H.

2. As an improvement in driving-gearing, the main driving-wheel A, having the journal-bearings of its axle $a$ in boxes secured to the beams B B, in combination with the transverse shafts F' F', having their journal-bearing in boxes D, secured to the spokes of the wheel A, such shafts F' F' having at their ends suitable gear-wheels intermeshing at one end with a large gear-wheel on the end of the axle $a$, and at the other end intermeshing with a pinion on the end of the hub of a suitable driving-pulley upon the end of the axle $a$, the whole operating substantially as and for the purpose specified.

In testimony whereof I affix my signature in presence of two witnesses.

JOHN C. WHITFORD.

Witnesses:
JOSHUA B. WEBSTER,
JAS. T. SUMMERVILLE.